Patented Feb. 27, 1940

2,192,030

UNITED STATES PATENT OFFICE 2,192,030

PROCESS FOR THE MANUFACTURE OF A LIGNIN-CONTAINING PRESS MASS

Hermann Burmeister, Berlin-Spandau, Germany, assignor to General Electric Company, a corporation of New York No Drawing. Application December 8, 1936, Serial No. 114,855. In Germany December 12, 1935

3 Claims. (Cl. 260—47)

It is known that lignin, which is the subtsance that imparts strength to wood, can be separated from cellulose by means of phenol. This method is used for the quantitative determination of cellulose. In view of this, experiments were conducted in which lignin was used instead of wood flour for the manufacture of molded articles. Lignin is available in large amounts as a by-product obtained in the saccharification of wood. Extensive tests have shown that the solubility of the lignin substance in phenols can be advantageously utilized for the manufacture of artificial masses having an extraordinarily great solidity. There may be used pure phenol (carbolic acid), as well as cresole, crude phenols, and tar oils; furthermore, phenols having a plurality of valences as, for instance, resorcinol may be employed, and, finally, one may resort also to other organic bases, such as aniline.

In order to carry out the process, the lignin is employed in pulverulent state as obtained, for instance, when saccharifying wood. The finely divided lignin is treated either according to the fusing method, that is to say, the powdered lignin and solid phenolic bodies of the kind above set forth are fused together, possibly with an addition of a small quantity of muriatic (hydrochloric) acid as a catalyst or the lignin is boiled together with a solution of a phenolic body such as hereinbefore described, either with or without the addition of a small amount of muriatic acid.

For the production of molded materials it is not necessary to remove the undissolved particles of lignin, as these particles are extraordinarily valuable as filler. If the lignin-phenol mixture is to be used as the base material for lacquer manufacture, it is easily possible to remove the floating particles by a simple filtering procedure.

In order that those skilled in the art better may understand how this invention may be carried into effect, the following specific example thereof is given:

One hundred grams of ground lignin are kneaded together with a solution of 11 grams of aniline or a corresponding amount of phenol or with a corresponding amount of a mixture of both these substances, and further with 150 cubic centimeters (132 grams) of benzole, this kneading procedure being carried out at a temperature of 75° C. and being continued for 4 hours. At the end of the kneading period the solvent and the excess of aniline or of phenol, or of both aniline and phenol if a mixture of the same has been used, are removed. The mass, after being pulverized if necessary, is pressed at a temperature of 140° C. and a pressure of 400 atmospheres (about 6000 pounds per square inch).

As fillers asbestos, cotton fibres or the like may be used. If desired small amounts of softening agents and fluxes also may be incorporated into the above-described mass.

If the above-described fusion method is used the fused mass is dissolved in a solvent, while in the case of the alcoholic decoction the decoction is directly used. The phenolic body is then condensed by means of a certain amount of formaldehyde, which makes it possible to obtain moldable and hardenable resins in accordance with well-known methods.

Additional quantities of filler, such as lignin, can be introduced in the material during the resinification process or after its completion. If it is desired to make use also of other fillers, these may be introduced into the resin in a known manner.

I claim:

1. The method of making a plastic composition which includes the steps of mixing together, by weight, 100 parts pulverized lignin from the saccharification of wood, 11 parts phenol solution and 132 parts benzol, kneading the mass for 4 hours at 75° C., and thereafter removing the solvent and the unreacted phenol.

2. The method of making a plastic composition which includes the steps of kneading, at an elevated temperature of the order of 75° C., a mixture comprising benzol, pulverized lignin from the saccharification of wood and phenol in an amount corresponding to approximately one-tenth the weight of the said lignin thereby to react active components of the lignin with the phenol, and thereafter removing the benzol and unreacted phenol.

3. The method of making a pressed article which includes the steps of kneading for a suitable time at a temperature of the order of 75° C. a mixture comprising benzol, pulverized lignin from the saccharification of wood and phenol in an amount corresponding to approximately one-tenth the weight of the said lignin thereby to react active components of the lignin with the phenol, removing the benzol and unreacted phenol, and pressing the resulting mass under heat and pressure.

HERMANN BURMEISTER.